(12) United States Patent
Guo et al.

(10) Patent No.: US 7,588,089 B2
(45) Date of Patent: Sep. 15, 2009

(54) IMPLEMENT WEIGHT AND CENTER OF GRAVITY DETERMINATION BASED ON HITCH CYLINDER PRESSURE

(75) Inventors: Haibo Guo, Naperville, IL (US); Yanming Hou, Pleasant Prairie, WI (US)

(73) Assignee: CNH America LLC, New Holland, PA (US)

( * ) Notice: Subject to any disclaimer, the term of this patent is extended or adjusted under 35 U.S.C. 154(b) by 361 days.

(21) Appl. No.: 11/553,117

(22) Filed: Oct. 26, 2006

(65) Prior Publication Data

US 2008/0110647 A1 May 15, 2008

(51) Int. Cl.
*A01B 63/12* (2006.01)
(52) U.S. Cl. .......................................... 172/7; 172/465
(58) Field of Classification Search ................... 172/1, 172/2, 4, 7, 10, 677, 605, 464, 465, 321, 172/315
See application file for complete search history.

(56) References Cited

U.S. PATENT DOCUMENTS

| | | | |
|---|---|---|---|
| 2,640,353 A | 6/1953 | Hefner | |
| 3,628,610 A | 12/1971 | Morkoski | |
| 3,731,744 A | 5/1973 | Lipinski | |
| 3,731,745 A | 5/1973 | Koch | |
| 3,990,520 A | 11/1976 | Koch et al. | |
| 4,057,109 A | 11/1977 | Nelson | |
| 4,637,474 A | 1/1987 | Leonard | |
| 4,775,940 A * | 10/1988 | Nishida et al. | ................ 701/50 |
| 4,807,136 A | 2/1989 | Rutkowski et al. | |
| 6,052,925 A | 4/2000 | Reiners | |
| 6,119,786 A * | 9/2000 | Creger et al. | ................... 172/7 |
| 7,430,846 B2 * | 10/2008 | Bomleny et al. | .......... 56/10.2 E |
| 2006/0016609 A1 | 1/2006 | Chauvel | |

FOREIGN PATENT DOCUMENTS

DE 3530817 3/1987

* cited by examiner

*Primary Examiner*—Thomas B Will
*Assistant Examiner*—Jamie L McGowan
(74) *Attorney, Agent, or Firm*—Patrick M. Sheldrake; John William Stader; Michael C. Harms

(57) ABSTRACT

A theorem and method for determining the weight and center of gravity of a ground-engaging implement connected to a three-point hitch on an agricultural tractor or other prime mover using hitch cylinder pressure and hitch position as calibration inputs to a hitch control system.

4 Claims, 3 Drawing Sheets

IMPLEMENT WEIGHT AND CENTER OF GRAVITY DETERMINATION BASED ON HITCH CYLINDER PRESSURE

BACKGROUND OF THE INVENTION

The present invention relates generally to hydraulically actuated implements attached to agricultural tractors or other primary sources or motive power, and more particularly to a method for calibrating systems that control the hitched implement in such an arrangement.

One of the most common uses of agricultural tractors is to move implements through agricultural fields to cultivate and condition the soil. Implements are commonly connected to the tractor using a three-point hitch. A three-point hitch device typically comprises two lower links, to which the implement is connected in rotary manner to swing about a given hinge axis; and a top link interposed between the tractor frame and the implement to control the angular position of the implement about the hinge axis. The lift arms are moved by an actuating cylinder (or cylinders) interposed between the tractor frame and the lift arms, movement of the lift arms raising and lowering the implement with respect to the ground. Three-point hitches may be front or rear mounted. Implements may thus be connected in front of the tractor and pushed through the soil, behind the tractor and pulled through the soil, or both. Three-point hitches, as well as numerous variations thereof, are well known in the agricultural industry.

It is desirable, and sometimes critical for today's farming practices, to control the depth of cultivation performed by various ground-engaging devices attached to the frame of the implement. As the frame is lowered closer to the ground, the ground-engaging devices or tools dig or cut deeper into the soil and the draft load on the tractor increases. As the frame is raised higher above the ground, the ground-engaging devices dig more shallowly into the soil thereby reducing the draft load on the tractor. Electronic control systems are increasingly used to maintain ideal implement draft or position, relieve the tractor operator from monitoring implement position and increase overall machinery productivity.

Electronic draft control systems alleviate the need for manual hitch adjustments by controlling the position of the connected implement in response to loads applied to the tractor by the implement. The control systems allow the depth of engagement to be adjusted so that a near constant draft load is applied to the tractor to smooth tractor operation. Alternatively, control systems may maintain the implement at a near constant depth of engagement thereby allowing the implement tools to follow field contours. Such control systems typically use one or more measuring devices to sense the draft loads applied to the hitch by the implement and then generate a control output to adjust the hitch position in response to the applied loads and desired position. Measuring devices are subjected to generally harsh environments that increase failure rates and reduce reliability. Such force sensing devices are typically installed only on rear three-point hitches which limit the draft control to rear hitched implements.

Electronic control systems require information about the attached implements in order to properly function. Implement weight and center of gravity are essential inputs to allow proper control system sensitivity to be established. Current systems rely on sensors located on the lower links of three point hitches to estimate implement weight. Numerous tests must first be carried out to establish the relationship between the implement weight and sensor output. A lookup table must then be generated to capture the test results. The implement weight is roughly estimated using such tables using a sensor input reading. Such a method is simple, but not inclusive. Only the tested conditions are tabulated; implement weights outside the tested range are approximated. Furthermore, the method does not represent the exact load on the hitch lift cylinders since implement center of gravity information and its associated moment arm are typically ignored.

It would be a great advantage to provide a reliable method for determining the actual weight and center of gravity for an implement coupled to a tractor to enable easy calibration a hitch control system. Further advantages would be realized if the method could be easily accomplished using simple measuring sensors on the tractor to determine coupled implement weight and center of gravity. Further advantages would be realized if theoretical equations could be derived to calculate the exact weight and center of gravity of an implement. These and other advantages are provided by the method for calibrating the control system described below.

SUMMARY OF THE INVENTION

Accordingly, it is an object of the present invention to provide a method for calibrating a hitch control apparatus that uses the actual implement weight and center of gravity as input for the calibration.

It is a further object of the present invention to provide a method for calibrating the control response sensitivity of a hitch control apparatus that improves the operational response of the control apparatus for a tractor.

It is a further object of the present invention to provide a method for determining the weight and center of gravity of a hitch-connected implement using inputs from simple hitch pressure and position sensors.

It is a still further object of the present invention to provide a method for calibrating a hitch control apparatus using actual implement weight and center of gravity measurements that is simple to execute and requires minimal time.

It is a still further object of the present invention to formulate theoretical expressions for calibrating a hitch control system in a tractor that relies on simple measurements to derive the connected implement weight and center of gravity.

It is a still further object of the present invention to provide a calibration method for hitch control systems that increases efficiency and quality of ground conditioning.

It is a still further object of the present invention to method for calibrating a hitch control apparatus for a tractor that relies on components durable in construction, inexpensive of manufacture, carefree of maintenance, easily assembled, and simple and effective to use.

These and other objects are achieved by providing a method for calibrating a hitch control system using hitch measurements to determine actual implement weight and center of gravity to provide accurate input to the control system for a primary motive power source (tractor) thereby enabling improved controllability on the tractor caused by a connected, ground-engaging implement.

BRIEF DESCRIPTION OF THE DRAWINGS

The advantages of this invention will be apparent upon consideration of the following detailed disclosure of the invention, especially when taken in conjunction with the accompanying drawings wherein.

DESCRIPTION OF THE PREFERRED EMBODIMENT(S)

Many of the fastening, connection processes and other means and components utilized in this invention are widely known and used in the field of the invention described, and their exact nature or type is not necessary for an understanding and use of the invention by a person skilled in the art, and they will not therefore be discussed in significant detail. Also, any reference herein to the terms "left" or "right," "up" or "down,"or "top" or "bottom" are used as a matter of mere convenience, and are determined by standing at the rear of the machine facing in its normal direction of travel. Furthermore the various components shown or described herein for any specific application of this invention can be varied or altered as anticipated by this invention and the practice of a specific application of any element may already be widely known or used in the art by persons skilled in the art and each will likewise not therefore be discussed in significant detail.

Figure 1:
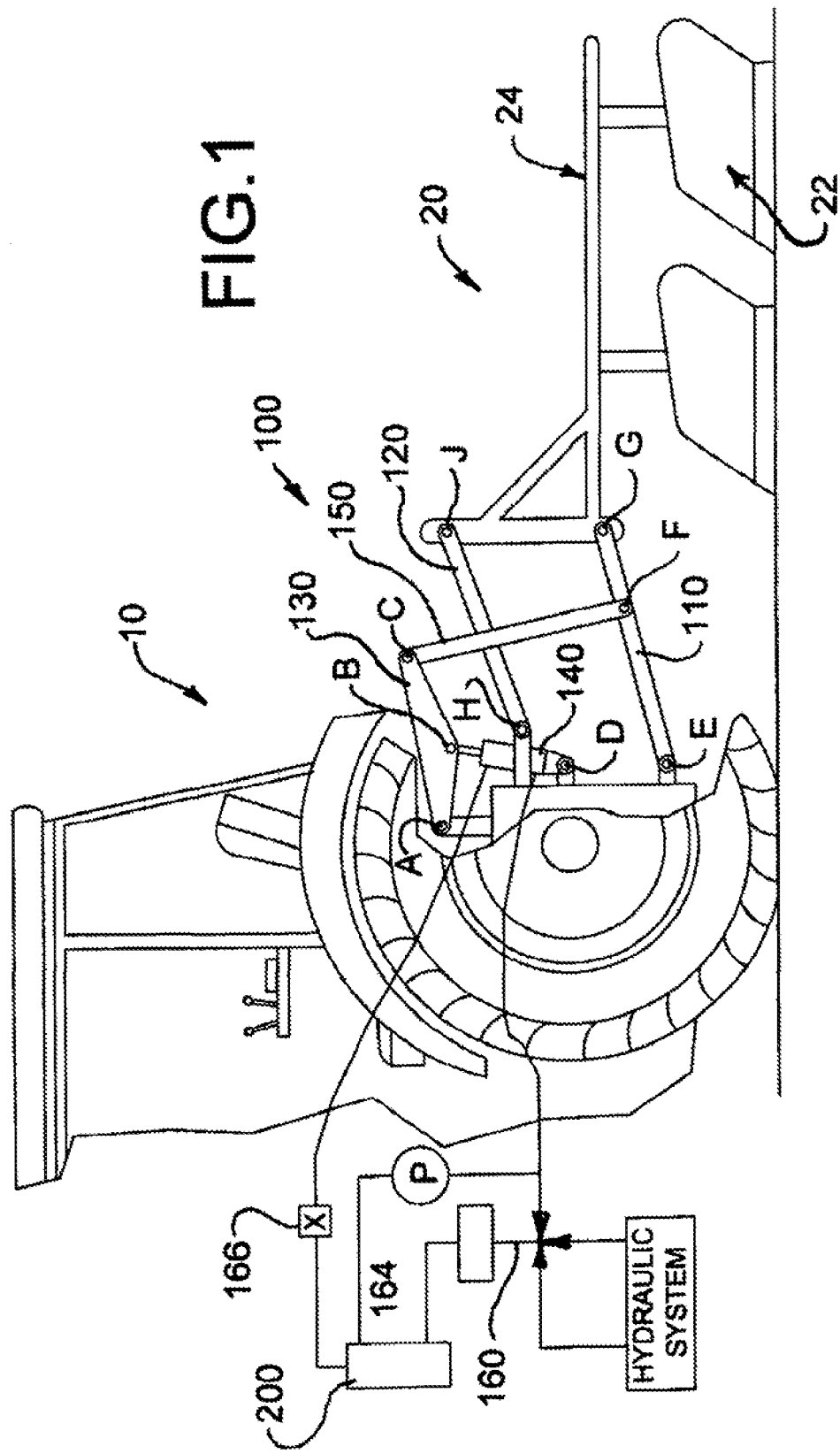
FIG. 1 is a side view of a three-point hitch of an agricultural tractor coupled to a ground-engaging implement in accordance with the present invention.

Referring now to FIG. 1, there is illustrated a side view of a three-point hitch 100 for an agricultural tractor 10 or other prime mover to which an implement 20 is coupled. Three-point hitch 100 includes a pair of lower link arms 110, actuating cylinders 140, rocker arms 130, lifting links 150 and top link arm 120. Only one link arm 110, actuating cylinder 140, rocker arm 130 and lifting link 150 is shown in the side view; however as one skilled in the art would know, hitch 100 could have two or more such link arm assemblies spaced laterally apart from each other. The position of implement 20 with respect to the ground is controlled by pivoting lower links 110 and top arm link 120 of three-point hitch 100 about their pivotal couplings (shown as points E and H) to tractor 10. Motive force for pivoting the three-point hitch is provided by actuating cylinders 140 acting on rocker arms 130 at lift point B which causes lifting links 150, connected at upper link point C to move and transfer motion to lower link arms 110 at lower link point F. Ground-engaging implement 20 is coupled to hitch 100 at upper hitch point J and a pair of lower hitch points G, located distally away from the connection of the lower link arms to the tractor (at point E) using conventional hitch pins and axially movable joints in the link arms. Each hitch point allows relative rotational motion between the hitch links and pins attached to the implement. As lower link arms 110 are raised and lowered, implement 20 is raised and lowered accordingly.

Implement 20 has several ground-engaging implements or tools 22 that are coupled to and extend downward from implement frame 24. These tools may include, for example, plows, rakes, harrows, or other ground cultivating devices. Whenever frame 24 is raised or lowered with respect to the ground by operation of three-point hitch 100, the depth of penetration of tools 22 is also increased or decreased. Thus, whenever actuation cylinders 140 retract, tools 22 extend further toward or into the ground. Whenever cylinders 140 extend, tools 22 move further from, or out of, the ground. As can be expected, changes in depth of penetration of the implement 20 into the ground affect the tractive effort (draft) required of the tractor to pull the implement through the ground.

Extension and retraction of the actuating cylinders 140 is controlled by a hydraulic control valve 160. Hitch position control may be manual, that is manually adjusted by the operator of the tractor, or automated wherein hitch position is adjusted by a controller in response to a sensed condition or conditions. FIG. 1 shows a hitch control system 200 located on the tractor that receives an actuation cylinder pressure signal from pressure transmitter 164, a hitch position signal from position sensor 166, and subsequently directs a hitch positioning signal to hydraulic control valve 160.

Draft control systems rely on the relationship between depth of penetration of implement 20 and draft load imposed on the tractor to manage draft load on the tractor. In order to accurately control draft load and properly establish control system responsiveness, the relationship between implement position and the resulting draft load must be determined and provided to the control system. Critical to this determination is the implement weight and center of gravity location. Implement weight can be determined by measuring the pressure of the hydraulic fluid within actuation cylinders 140. As will be shown in the following discussion, monitoring hydraulic pressure and hitch position while an implement is lifted allows the location of the center of gravity to be determined as well.

Figure 2:
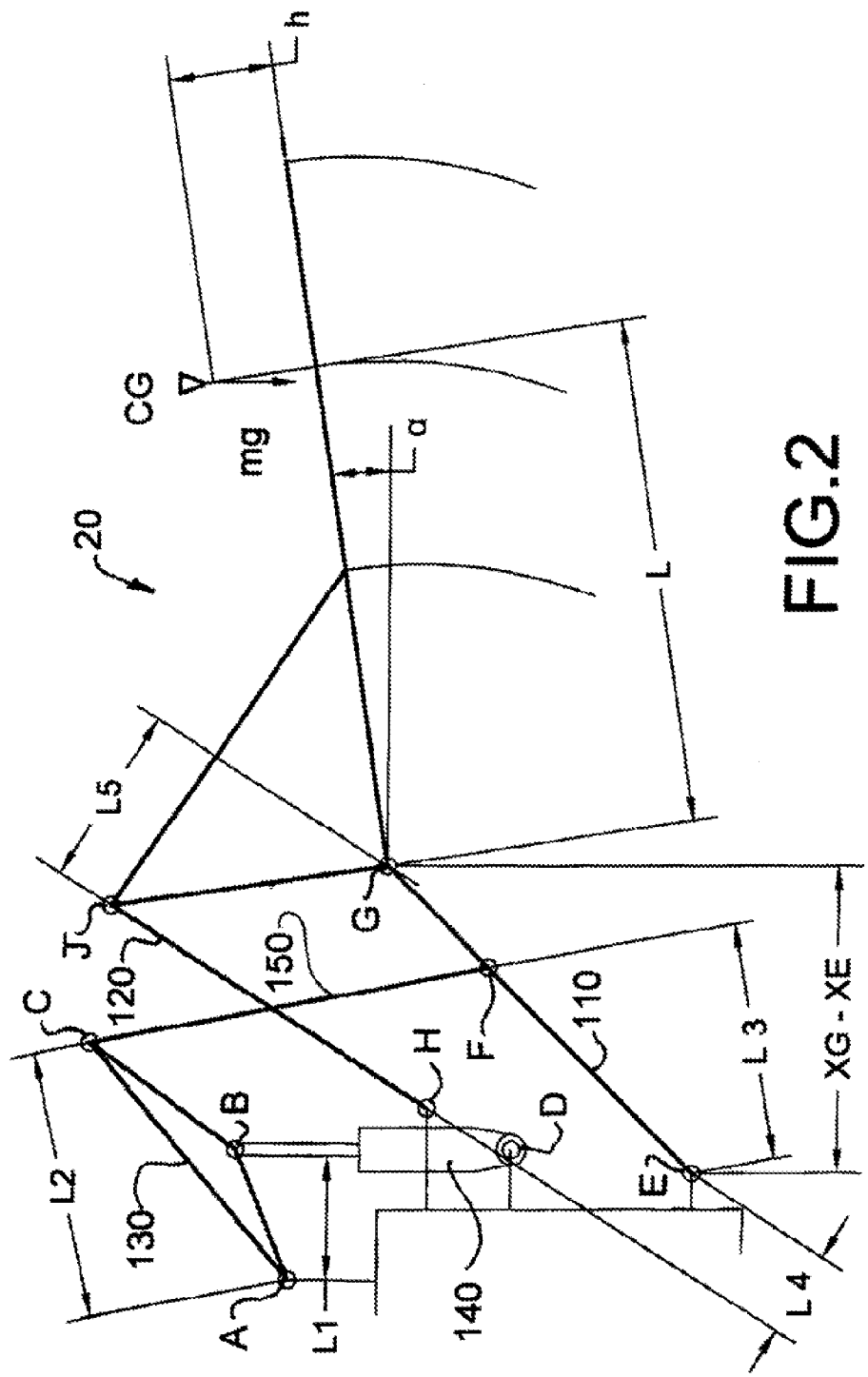
FIG. 2 is a diagram of the hitch and coupled implement showing forces acting on the combination.

FIG. 2 shows a diagram of a conventional three-point hitch 100 having a coupled, ground-engaging implement 20 with the various forces, moments, and moment arms illustrated. Implement 20 has a mass, m, and a center of gravity (cg) located a horizontal distance, l, and vertical distance, h, from the lower link 110, pivot point G when the implement frame is horizontal. For the moment balance on the rocker arm 130 (points A-B-C):

$$\sum M_A = F_{DB} \cdot l_1 - F_{CF} \cdot l_2 = 0$$

$$F_{CF} = \frac{l_1}{l_2} F_{DB}$$

where $F_{DB}$ is the actuation cylinder 140 force, in Newtons, equals the actuation cylinder piston area, $A_p$, multiplied by the actuation cylinder hydraulic pressure, $P_h$. $F_{CF}$ is the lift link 150 (points C-F) force having a direction along the link if its mass is neglected. The distance of pin A to the lift cylinder 140 (points BD) is $l_1$ and $l_2$ is the distance of pin A to the lift link 150 (points C-F).

$$F_{DB} = 2A_p \cdot P_h \quad (1)$$

When the implement is lifted above the ground, top link 120 (points H-J) is in tension. In the moment balance on the implement 20, the force, $F_{H-J}$, at pivot point J will balance out the implement weight, mg.

$$\sum M_G = F_{HJ} \cdot l_5 - mg \cdot (l \cos\alpha - h \sin\alpha) = 0$$

$$F_{HJ} = \frac{l\cos\alpha - h \sin\alpha}{l_5} \cdot mg$$

where l is the horizontal distance of the implement cg, and h is the vertical distance of the implement cg. The distance of lower link 110, pin G to the top link 120 $l_5$.

For the subsystem of lower link 110 (points E-F-G) and implement 20 (points G-J), $$\sum M_E = F_{CF} \cdot l_3 + F_{HJ} \cdot l_4 - mg \cdot ((X_G - X_E) + (l \cos\alpha - h \sin\alpha)) = 0$$

where a is implement tilt angle from horizontal plane. The term $X_G$-$X_E$ is the horizontal projection of the lower link 110.

The distance $l_3$ is from pin E to the lift link 150 (points C-F), and $l_4$ is the distance from pin E to the top link 120 (points H-J).

Substituting the previous equations into the above, yields the following equation.

$$\frac{l_1 l_3}{l_2} F_{DB} + \frac{l_4}{l_3}(l\cos\alpha - h\sin\alpha)mg - \qquad (2)$$
$$mg((X_G - X_E) + (l\cos\alpha - h\sin\alpha)) = 0$$

Solving for implement weight, mg, yields:

$$mg = \frac{1}{(X_G - X_E) + \left(1 - \frac{l_4}{l_5}\right)(l\cos\alpha - h\sin\alpha)} \frac{l_1 l_3}{l_2} F_{DB} \qquad (3)$$

Figure 3:
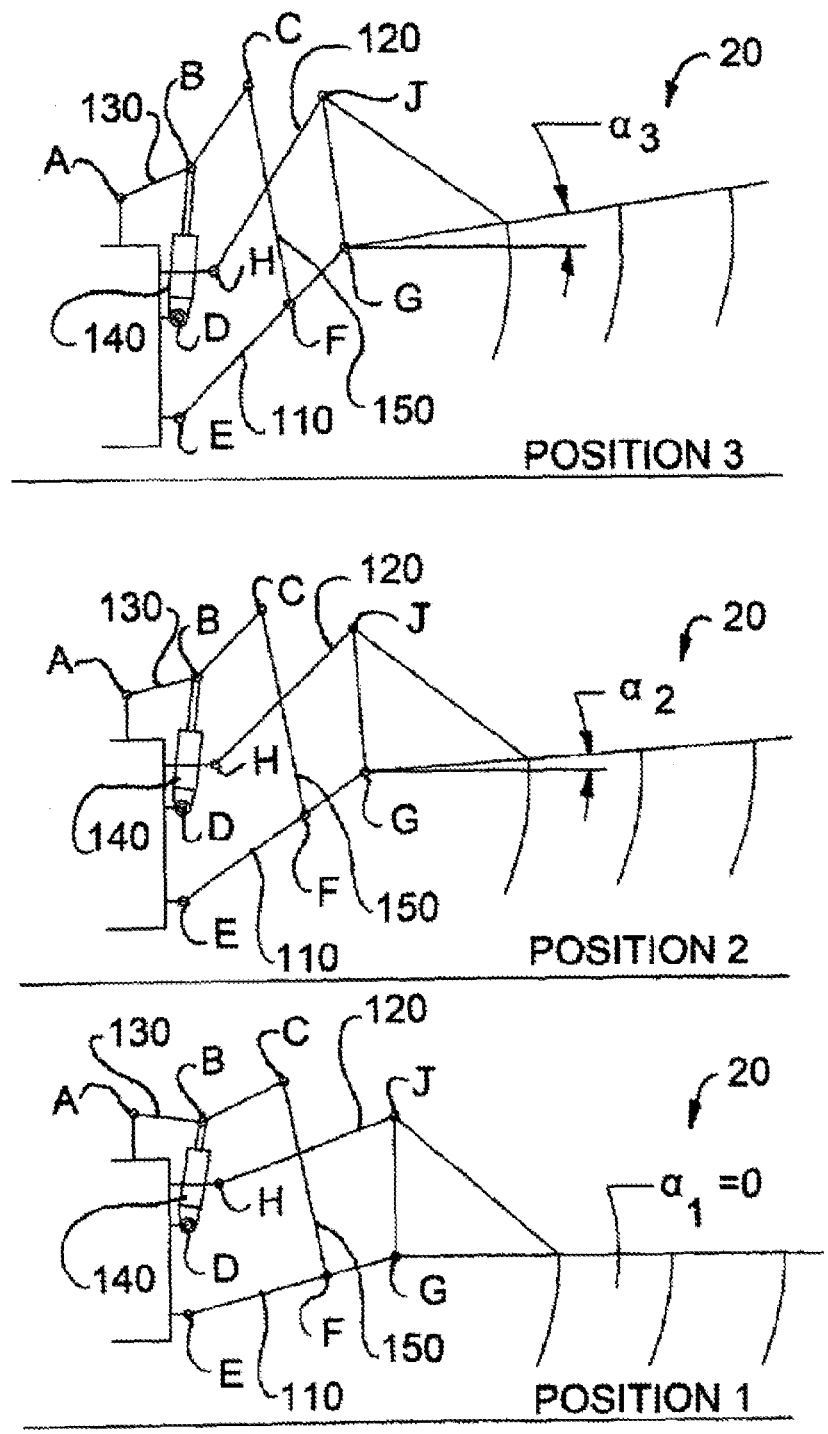
FIG. 3 is a diagram of the hitch and coupled implement showing the implement in three discreet positions necessary to obtain input for the present invention.

Referring now to FIGS. 2 and 3, equation (3) can be simplified as:

$$mg = \frac{1}{B + C(l\cos\alpha - h\sin\alpha)} F_{DB} \qquad (4)$$

where $$A = \frac{l_1 l_3}{l_2}$$
$$B = X_G - X_E$$
$$C = 1 - \frac{l_4}{l_5}$$

Lifting the implement and recording implement/hitch positions at three discreet locations ($A_1$, $A_2$, $A_3$, $B_1$, $B_1$, $B_2$, $B_3$, $C_1$, $C_2$, $C_3$, $a_1$, $a_2$, $a_3$) from the hitch position sensor 166 and the actuating cylinder pressures ($Ph_1$, $Ph_2$, $Ph_3$) measured from pressure sensor 164, three equations similar to equation (4) describe the implement weight, mg. Since weight and center of gravity of the implement 20 should not change based on implement position, the three equations should all be equal, that is:

$$\frac{A_1}{B_1 + C_1(l\cos\alpha_1 - h\sin\alpha_1)} F_{DB1} = \frac{A_2}{B_2 + C_2(l\cos\alpha_2 - h\sin\alpha_2)} F_{DB2} \qquad (5)$$

$$\frac{A_1}{B_1 + C_1(l\cos\alpha_1 - h\sin\alpha_1)} F_{DB1} = \frac{A_3}{B_3 + C_3(l\cos\alpha_3 - h\sin\alpha_3)} F_{DB3} \qquad (6)$$

l and h are implement center of gravity x and y coordinates from hitch point G when implement is horizontal, and they should be the same regardless of implement positions.

Solving equation (5) to determine l provides:

$$l = \frac{(A_2 F_{DB2} B_1 - A_1 F_{DB1} B_2) + (A_1 F_{DB1} C_2 \sin\alpha_2 - A_2 F_{DB2} C_1 \sin\alpha_1)h}{A_1 F_{DB1} C_2 \cos\alpha_2 - A_2 F_{DB2} C_1 \cos\alpha_1} \qquad (7)$$

For the given implement lifted positions, only l and h are unknown. Equation (7) may be thus simplified as:

$$l = D_1 + E_1 h \qquad (8)$$

Similarly, solving equation (6) for l yields:

$$l = \frac{(A_3 F_{DB3} B_1 - A_1 F_{DB1} B_3) + (A_1 F_{DB1} C_3 \sin\alpha_3 - A_3 F_{DB3} C_1 \sin\alpha_1)h}{A_1 F_{DB1} C_3 \cos\alpha_3 - A_3 F_{DB3} C_1 \cos\alpha_1} \qquad (9)$$

and $$l = D_2 + E_2 h \qquad (10)$$

Solving for h using equations (8) and (10) provides:

$$h = \frac{D_2 - D_1}{E_1 - D_2} \qquad (11)$$

Parameters A, B, C, D and E are a function of hitch position, a, which is measured by hitch position sensor 166. The parameters can be predetermined for a given hitch design, that is for the relative length of top link 120 and lower link 110 along with the relative positions of their connection points to the tractor. The cylinder forces, $F_{DB}$'s are measured with pressure transducer and converted to force values.

Once h is known, l can be determined from equation (7) or equation (9). Implement weight, mg, can be derived from equation (4). Thus, implement weight and the location of the implement center of gravity are known.

If it is assumed hsina is small, weight and center of gravity location can be determined by measuring actuator cylinder pressure and hitch position at only two positions. Simplifying equation (9) yields:

$$l = \frac{A_2 F_{DB2} B_1 - A_1 F_{DB1} B_2}{A_1 F_{DB1} C_2' - A_2 F_{DB2} C_1'}$$

and $$mg = \frac{A_2}{B_2 + C_2' l} F_{DB2}$$

where $$C' = C\cos\alpha$$

It can be seen that l is a function of the ratio of cylinder pressures, and implement weight, mg, is a linear function of the cylinder pressure.

Calibrating the hitch control system 200 requires that the implement 20 be connected to the hitch 100 and lifted without engaging the ground. Using the above-described relationships, the hitch system uses actuating cylinder pressure and hitch position and two or more discreet positions within the lifting path to compute implement weight and center of gravity. These parameters, once known, are used to calibrate the control sensitivity of the control system.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the inventions.

Having thus described the invention, what is claimed is:

1. A method for controlling a ground-engaging implement coupled to an agricultural tractor, the method comprising the steps of:
   providing a ground-supported agricultural tractor having a three-point hitch movable in upward and downward directions by at least one hydraulic actuating cylinder;
   providing a ground-engaging implement attached to the hitch of the tractor;
   providing a hitch control apparatus for managing the upward/downward position of the hitch to maintain a desired draft load or position on the tractor, the hitch control apparatus having programming implementing theory and equations to derive implement weight and center of gravity location;
   providing an actuating cylinder pressure sensor for measuring hydraulic pressure in the actuating cylinder and communicating a pressure value to the hitch control apparatus;
   providing a hitch position sensor for measuring upward/downward position of the hitch and communicating a position value to the hitch control apparatus;
   positioning the implement in a first position with no portion of its weight supported by the ground;
   generating a first pressure value by the actuating cylinder pressure sensor;
   generating a first position value by the hitch position sensor;
   communicating the first pressure value and the first position value to the hitch control apparatus;
   positioning the implement in a second position;
   generating a second pressure value by the actuating cylinder pressure sensor;
   generating a second position value by the hitch position sensor;
   communicating the second pressure value and the second position value to the hitch control apparatus; and
   deriving from the first and second pressure and position values of the hitch, in accordance with the programming of the hitch control apparatus, an implement weight and a location of an implement center of gravity by the hitch control apparatus;
   wherein said center of gravity of said implement is derived from the ratio of said first and second generated pressure values.

2. The method of claim 1, wherein the position value of hitch includes distances between the hitch points and pivotal couplings of lower and upper links of the hitch.

3. The method of claim 1, wherein said weight of said implement vehicle is derived from hitch dimensions and as a linear function of the pressure value at a hitch position.

4. A method for controlling a ground-engaging implement coupled to an agricultural tractor, the method comprising the steps of:
   providing a ground-supported agricultural tractor having a three-point hitch movable in upward and downward directions by at least one hydraulic actuating cylinder;
   providing a ground-engaging implement attached to the hitch of the tractor;
   providing a hitch control apparatus for managing the upward/downward position of the hitch to maintain a desired draft load or position on the tractor, the hitch control apparatus having programming implementing theory and equations to derive implement weight and center of gravity location;
   providing an actuating cylinder pressure sensor for measuring hydraulic pressure in the actuating cylinder and communicating a pressure value to the hitch control apparatus;
   providing a hitch position sensor for measuring upward/downward position of the hitch and communicating a position value to the hitch control apparatus;
   positioning the implement in a first position with no portion of its weight supported by the ground;
   generating a first pressure value by the actuating cylinder pressure sensor;
   generating a first position value by the hitch position sensor;
   communicating the first pressure value and the first position value to the hitch control apparatus;
   positioning the implement in a second position;
   generating a second pressure value by the actuating cylinder pressure sensor;
   generating a second position value by the hitch position sensor;
   communicating the second pressure value and the second position value to the hitch control apparatus; and
   deriving from the first and second pressure and position values of the hitch, in accordance with the programming of the hitch control apparatus, an implement weight and a location of an implement center of gravity by the hitch control apparatus;
   wherein said weight of said implement vehicle is derived from hitch dimensions and as a linear function of the pressure value at a hitch position.

* * * * *